Dec. 28, 1926.
S. MESTERTON
1,612,637
BODY MEASURING DEVICE
Filed Oct. 23, 1924
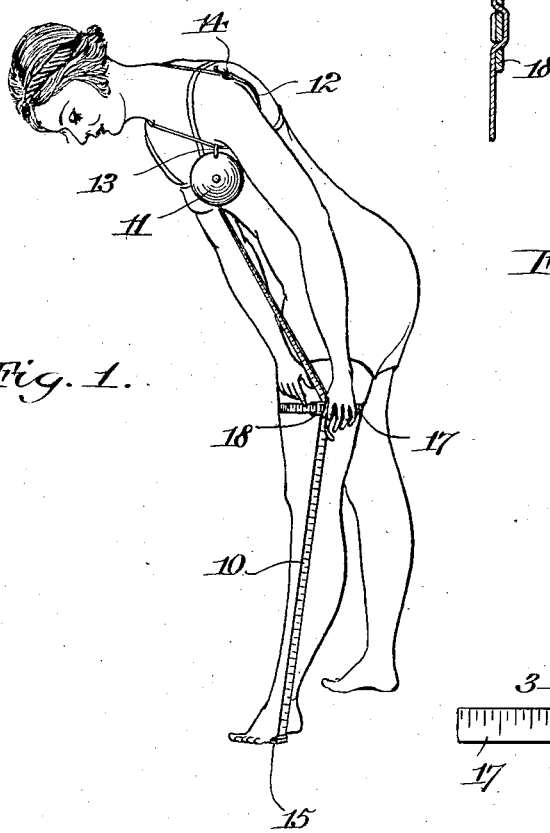
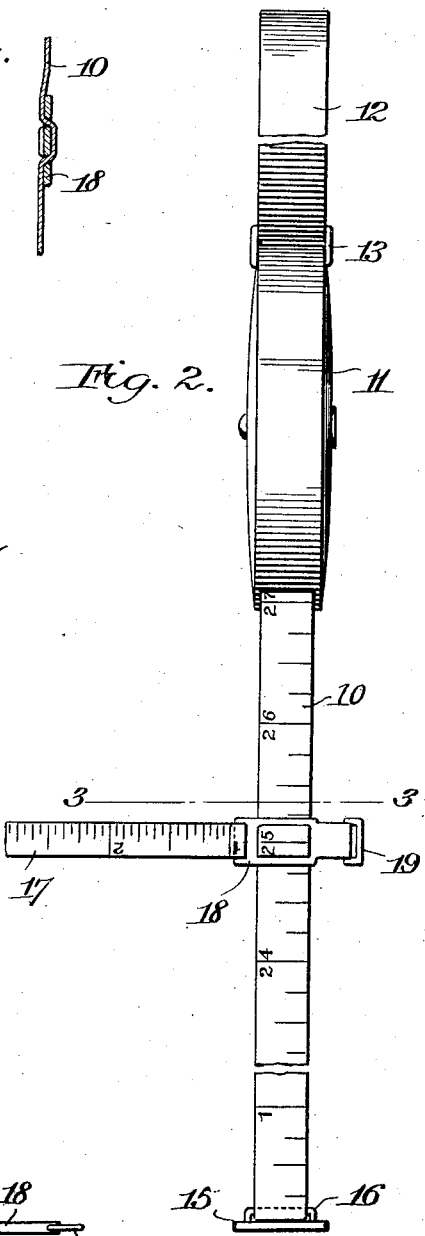
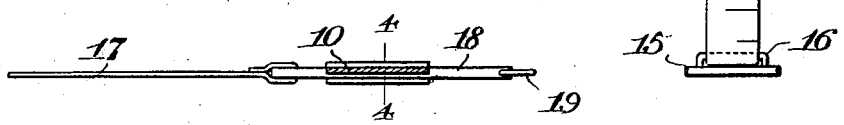
WITNESSES:
INVENTOR,
Sonja Mesterton,
BY
ATTORNEYS.

Patented Dec. 28, 1926.

1,612,637

UNITED STATES PATENT OFFICE.

SONJA MESTERTON, OF PORT CHESTER, NEW YORK.

BODY-MEASURING DEVICE.

Application filed October 23, 1924. Serial No. 745,472.

My invention relates to a measuring device and particularly to a device for taking measurements of parts of the human body to record the same for comparison to indicate the changes in the body measurements.

The general object of my invention is to provide an efficient device for the indicated purpose having means to hold the device to the body of the user and in a manner to permit one to take the measurements of one's own torso, legs and arms without the aid of another person.

The invention has for its object to provide a device adapted for the convenient taking of one's own measurement and composed of few parts of simple form.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1 is a perspective view of my improved measuring device as employed by a woman taking her own measurements;

Figure 2 is an elevation of the device on an enlarged scale partly broken away;

Figure 3 is a sectional plan view on the line 3—3, Figure 2;

Figure 4 is a detail in vertical section on the line 4—4, Figure 3.

In carrying out my invention in practice, in accordance with the illustrated example, a tape measure 10 is provided, preferably of steel, said measure being adapted to be retracted into a casing at 11 as in the case of spring-wound tape measures. To the casing 11 is secured a strap 12 adapted to be brought around the shoulder adjacent the arm of the user to sustain the tape measure casing 11 in position and permit of the tape measure being withdrawn and brought downwardly. The strap 12 in the illustrated example is passed through a loop 13 swingably secured to a casing 11 near the edge. Said strap is provided with a buckle 14 or other suitable adjusting means.

In order that the tape measure 10 may be drawn from the casing 11 and held in extended position along the body and a leg to a foot of the user for taking measurements at any zone along the body, I provide on the outer end of the tape measure 10 a foot pad 15 which may be placed beneath the foot as indicated in Figure 1. The pad 15 may consist of a strip of hard rubber, wood or other suitable material. It is shown as secured to the tape measure 11 by a loop 16 through which said measure is passed.

In connection with the main tape measure 10, I provide an auxiliary tape measure 17 held to the measure 10 by a slide 18 with sufficient friction that said slide will maintain its position along the tape measure 10. The tape measure 17 extends laterally from the slide 18 and is adapted to be brought around the body or leg of the user, the end of the auxiliary tape measure being adapted to be passed through a loop 19 on the slide 18 at that end opposite said tape measure 17.

From the above description, it will be clear that with the tape measure casing 11 held to the body of the user at the shoulder by the strap 12, the tape measure 10 may be withdrawn from the casing 11 sufficiently for the foot of the user to be placed on the pad 15. The slide 18 may be now shifted vertically to permit the auxiliary tape measure 17 to be passed about the user at the zone to be measured. The friction of the slide 18 holds the auxiliary tape measure 17 in position until the measurement is recorded. It will be seen that without any assistance a person may take one's own measurements with convenience so that accurate record may be kept of the dimensions of the body at different zones.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A measuring device of the class described, comprising a tape measure casing, a strap to hold the casing to the body at the shoulder, a member on the outer end of the tape measure adapted to be placed beneath the foot of the user to maintain the tape measure stretched along the body from a point adjacent to the shoulder, a slide on the tape measure and frictionally held thereto to permit of its adjustment along the tape measure, an auxiliary flexible tape measure held to said slide and adapted to be brought around the body at different zones according to the position of the slide on the first-mentioned tape measure, and a loop on the slide through which the auxiliary tape measure may be passed in disposing said auxiliary tape measure about the body or leg of the user.

2. A measuring device of the class described, including a tape measure casing, means to suspend said casing from the upper portion of the body, a flexible tape measure adapted to wind within said casing or to be withdrawn from the casing and extended to be disposed along the body, means on the tape measure adapted to be placed beneath the foot of the user to hold the said tape measure extended along the body of the user, and an auxiliary flexible tape measure slidably connected at one end to said first mentioned tape measure and adapted to be brought about the body at various zones.

SONJA MESTERTON.